US006725004B2

(12) United States Patent

Ahn et al.

(10) Patent No.: US 6,725,004 B2
(45) Date of Patent: Apr. 20, 2004

(54) COUPLING APPARATUS USED WITH A PRINTER OR PHOTOCOPIER

(75) Inventors: Byeong-hwa Ahn, Yongin (KR); Joo-hwan Noh, Suwon (KR); Kyung-hwan Jang, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 10/242,445

(22) Filed: Sep. 13, 2002

(65) Prior Publication Data

US 2003/0099485 A1 May 29, 2003

(30) Foreign Application Priority Data

Nov. 27, 2001 (KR) ........................................ 2001-74159

(51) Int. Cl.$^{7}$ ............................ G03G 15/00; F16D 1/02

(52) U.S. Cl. ......................... 399/117; 399/88; 399/167; 403/359.1; 464/160; 464/182

(58) Field of Search .......................... 399/88, 167, 159, 399/90, 116, 117; 464/160, 179, 182; 403/359.1, 359.6, 361

(56) References Cited

U.S. PATENT DOCUMENTS 4,623,277 A * 11/1986 Wayne et al. ........... 464/182 X
5,226,853 A * 7/1993 Courgeon ................... 464/160
6,510,298 B1 * 1/2003 Kobayashi et al. ........... 399/90
2001/0008590 A1 * 7/2001 Katada et al. .............. 399/167
2002/0085858 A1 * 7/2002 Yamaguchi et al. ........ 399/167

FOREIGN PATENT DOCUMENTS

JP 2002-258675 * 9/2002

* cited by examiner

*Primary Examiner*—Sophia S. Chen
(74) *Attorney, Agent, or Firm*—Staas & Halsey LLP

(57) ABSTRACT

A coupling apparatus capable of being connected by sliding and transferring power when being connected. The apparatus has a first coupler having a plurality of first ribs protruding at an outer circumference of a body at a regular interval and a second coupler having a connection portion to embrace and be separated from the body of the first coupler, and a plurality of second ribs protruding at an inner circumference of the connection portion, the plurality of second ribs being connected between the plurality of first ribs, wherein each of front ends of the first ribs and the second ribs have sloping sides sloped in a predetermined direction, and the first ribs include a rib having a relatively longer length than the other ribs.

18 Claims, 7 Drawing Sheets

COUPLING APPARATUS USED WITH A PRINTER OR PHOTOCOPIER

CROSS-REFERENCE TO RELATED APPLICATIONS

This application claims the benefit of Korean Application No. 01-74159, filed Nov. 27, 2001, in the Korean Industrial Property Office, the disclosure of which is incorporated herein by reference.

BACKGROUND OF THE INVENTION

1. Field of the Invention

The present invention relates to a coupling apparatus used to transmit power.

2. Description of the Related Art

Generally, a photoelectric printer such as a laser printer or a photocopying machine has a development cartridge to form an image. The development cartridge has an integrally formed toner cartridge to supply a toner, a development agent, and a rotatable photosensitive drum. The photosensitive drum forms an electrostatic latent image corresponding to a desired image by a projected light from a laser projection unit. Furthermore, a certain image formed as toner supplied by a toner supply unit, is stuck on the formed electrostatic latent image. In addition, the toner image formed on the photosensitive drum is printed on a paper passing through the photosensitive drum and a settlement roller.

On the other hand, the development cartridge is a disposable one when the toner filled up inside of the cartridge is exhausted. Therefore, the development cartridge is removably connected with a printer body. The development cartridge can have a power transmitted thereto from a predetermined driving unit of the printer body through a coupling apparatus when being placed in the printer body. In other words, a coupling apparatus to drive the photosensitive drum and a roller to supply the toner is installed within the printer. FIG. 1 illustrates one example of the coupling apparatus.

Referring to FIG. 1, a coupling apparatus has a driven coupler 10 connected with one end of the photosensitive drum of the development cartridge, and a driving coupler 20 to transmit power to the driven coupler 10. The driven coupler 10 has a cylindrical body 11, a connection shaft 13 extended from the body 11 and connected with the photosensitive drum, and eight ribs 15 linearly protruding at an outer circumference of the body 11. Each of the ribs 15 is disposed having the same lengths at an interval of 45°, and integrally formed at the body 11. Moreover, front ends of each of the ribs 15 have sloping sides 15*a* sloped in a same direction.

The driving coupler 20 is integrally formed at a driving gear 21 having the power from a driving motor (not shown) transmitted thereto. The driving coupler 20 has a cylindrical body 23, and four ribs 25 protruding at an inner circumference of the body 23. The ribs 25 are disposed at a same interval of 90°. Additionally, front ends of each of the ribs 25 have sloping sides 25*a* sloped in the same direction with the sloping sides 15*a* of the ribs 15 when being connected with the driven coupler 10.

For the coupling apparatus having the above structure, the body 11 of the driven coupler 10 is inserted into the body 23 of the driving coupler 20 when being connected with each other. In this case, each of the ribs 25 is inserted between each of the ribs 15 of the driven coupler 10 to be coupled.

However, it is very difficult to form each of the ribs 15 and 25 to have a regular interval due to manufacturing errors. In other words, as illustrated in FIG. 2, the interval T1 of the ribs 15 might be more narrow than the interval T2 of the ribs 25. In this case, like the part A in FIG. 2, the front ends of each of the ribs 15 and 25 are contacted with each other while being sloped, thus connection cannot be easily performed.

SUMMARY OF THE INVENTION

Accordingly, it is the object of the present invention to provide a coupling apparatus having an improved structure for easy connection.

Additional objects and advantages of the invention will be set forth in part in the description which follows and, in part, will be obvious from the description, or may be learned by practice of the invention.

The foregoing and other objects of the present invention are achieved by providing a first coupler having a body and a plurality of first ribs protruding at an outer circumference of the first coupler body at a regular interval; and a second coupler having a cylindrical connection portion to embrace and be separated from the body of the first coupler, and a plurality of second ribs protruding at an inner circumference of the connection portion, the plurality of second ribs to be connected between the plurality of first ribs. Each of front ends of the first ribs and the second ribs have sloping sides sloped in a predetermined direction, and one of the first ribs and the second ribs include at least one rib having a relatively longer length than the other ribs.

In an aspect of the present invention, two ribs are relatively longer among the first ribs.

Further, another aspect of the invention provides that two ribs are relatively longer among the second ribs.

In another aspect of the invention, the first ribs are eight in number and disposed at a regular interval and two of them are relatively long with respect to the other ribs, and the second ribs are four in number and disposed at a regular interval.

In an aspect of the present invention, the ones of the ribs close to the at least one relatively longer rib among the first and the second ribs have sides sloping in a different direction from ribs of the corresponding coupler.

Moreover, the at least one relatively long ribs among the first and the second ribs have sides sloping in a same direction with ribs of the corresponding coupler.

Additionally, a driving gear is connected with the connection portion of the second coupler in order to transfer power.

The foregoing and other objects of the present invention may also be achieved by providing a coupling apparatus to transfer power to drive a photosensitive drum disposed at a development cartridge and removably connected with a printer body according to another embodiment of the present invention to accomplish the above object comprises: a first coupler having a body with a plurality of first ribs protruding at an outer circumference of one end of said first coupler body, another end of the first coupler body is connected with the photosensitive drum; and a second coupler having a connection portion embracing and being separated from the first coupler body, and a plurality of second ribs protruding at an inner circumference of the connection portion. One of the first ribs and the second ribs include a rib having a relatively longer length than the other ribs.

In an aspect of this embodiment, the first ribs are eight in number and disposed at a regular interval, and two ribs among them are relatively long with respect to the other ribs.

Further, a driving gear is connected with the second coupler.

Additionally, sides sloping in a same direction with ribs of a corresponding coupler are formed at the front ends of the ribs relatively longer than relatively shorter other ribs among the first and the second ribs, and sides sloping in a different direction are formed at front ends of the relatively shorter ribs.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
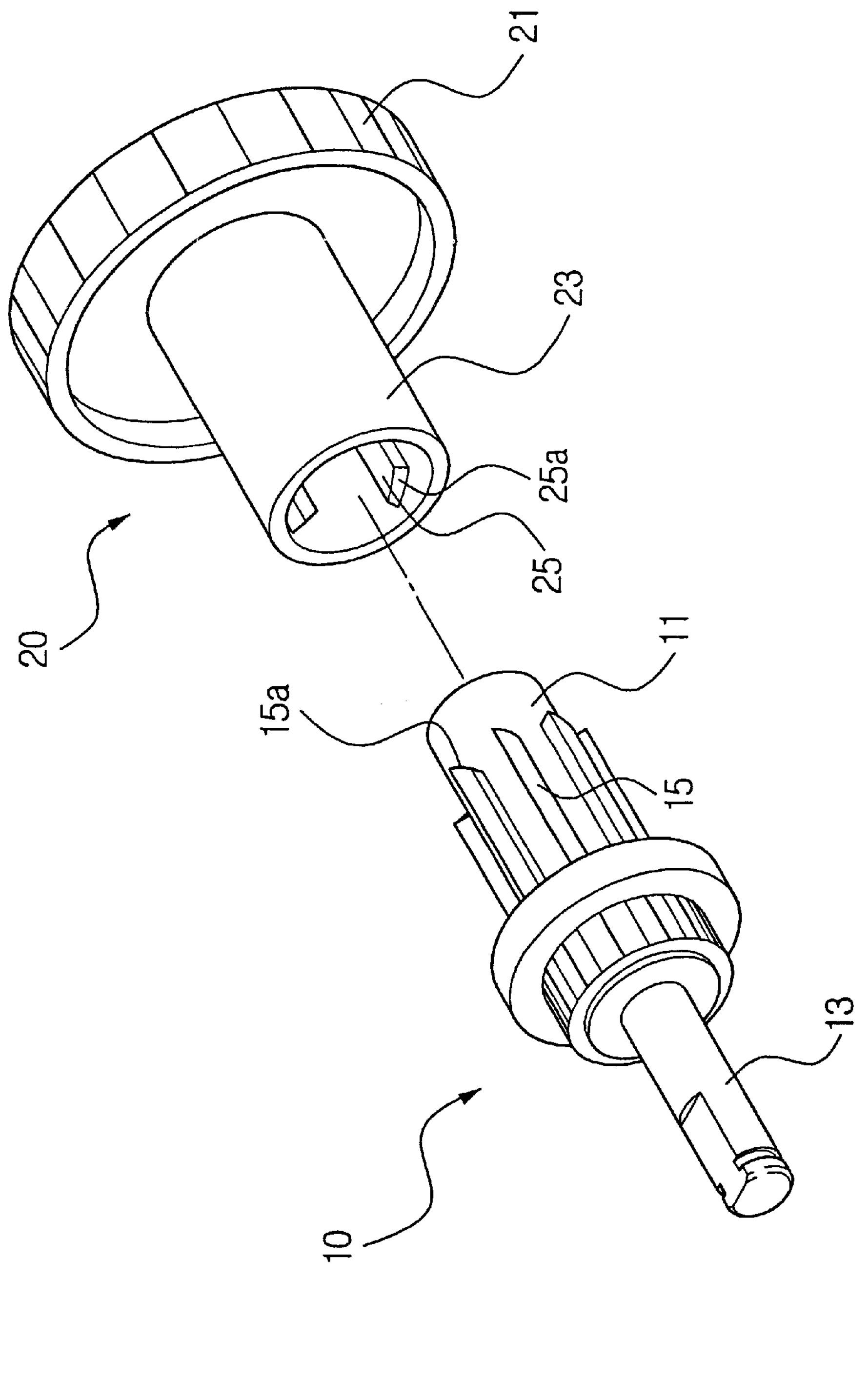
FIG. 1 (PRIOR ART)
FIG. 1 is a perspective view schematically illustrating a conventional coupling apparatus.
Figure 2:
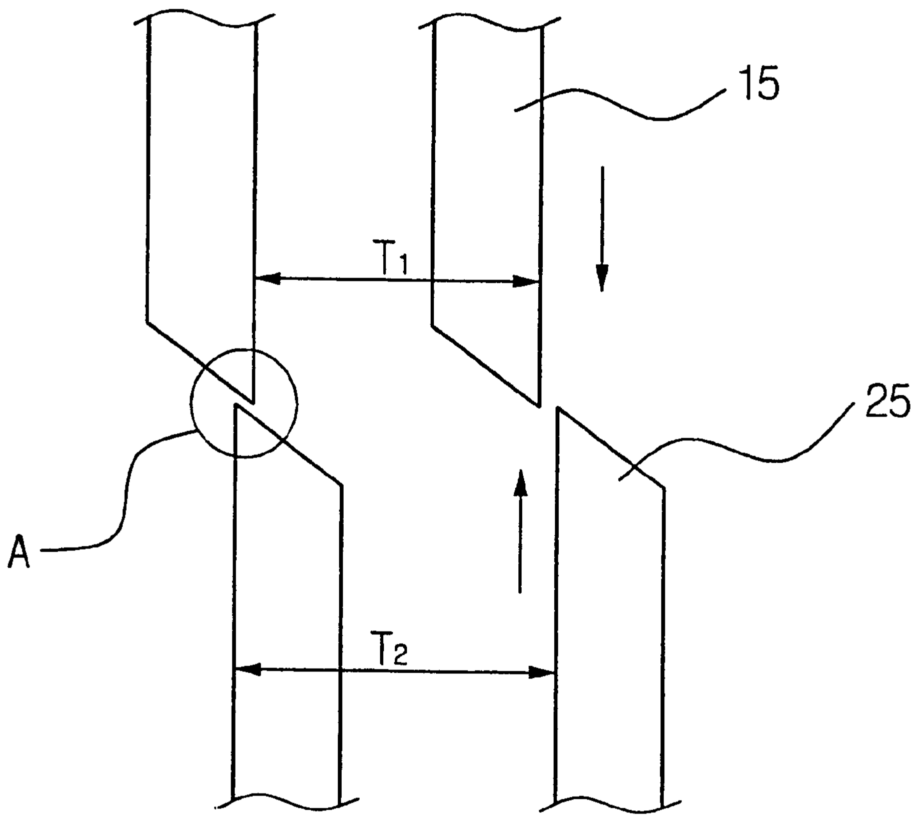
FIG.2 (PRIOR ART)
FIG. 2 is a view illustrating a connection status of the coupling apparatus of FIG. 1.

Reference will now be made in detail to the embodiments of the present invention, examples of which are illustrated in the accompanying drawings, wherein like reference numerals refer to like elements throughout. The embodiments are described below in order to explain the present invention by referring to the figures.

Hereinbelow, the present invention will be described in great detail by referring to the appended drawings.

Figure 3A:
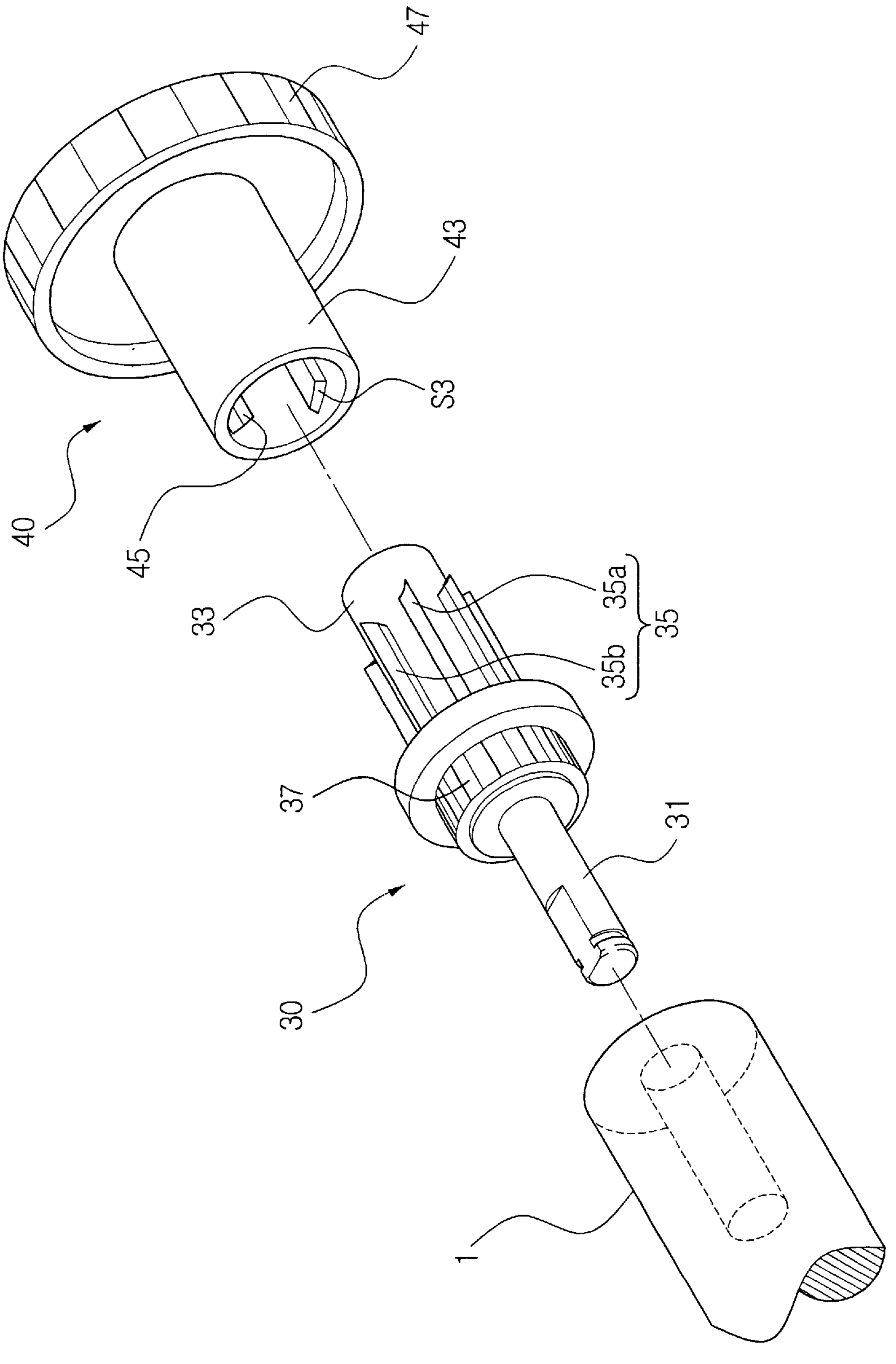
FIG. 3A is an exploded perspective view schematically illustrating a coupling apparatus according to an embodiment of the present invention.
Figure 3B:
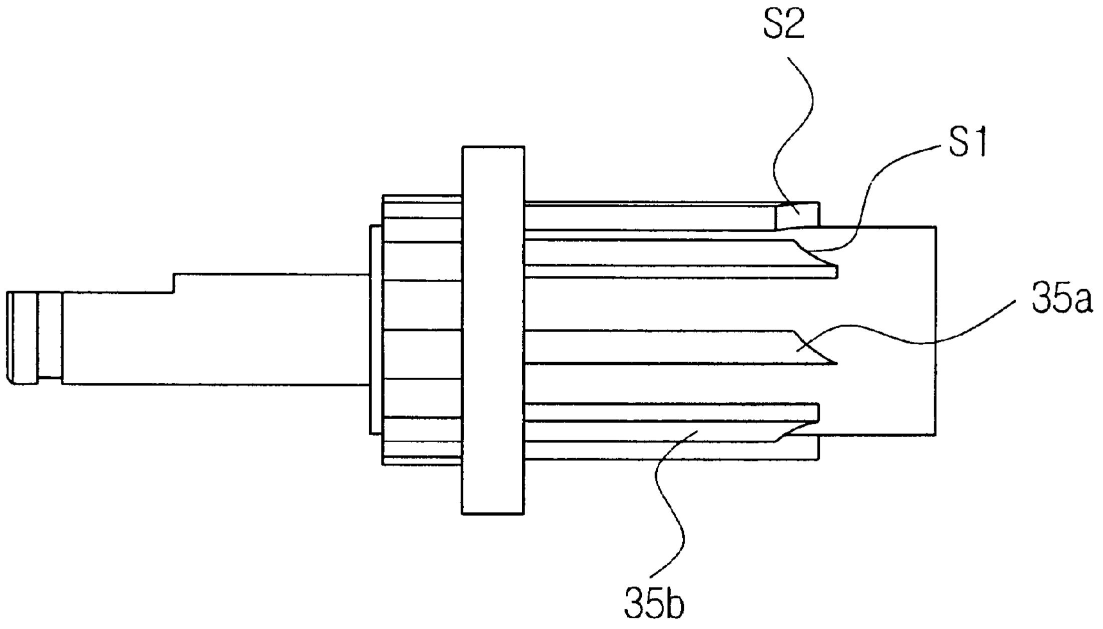
FIG. 3B is a side view of a first coupler illustrated in FIG. 3A.

Referring to FIG. 3, a coupling apparatus according to an embodiment of the present invention has a first coupler 30 and a second coupler 40. The first coupler 30 is connected with one end of a photosensitive drum 1. The photosensitive drum 1 is rotatably disposed in a development cartridge of a printer. The development cartridge is removably disposed in a printer body.

Therefore, the coupling apparatus according to this embodiment is used to transfer a power to the development cartridge installed in the printer body.

The first coupler 30 has a shaft 31 connected with the photosensitive drum 1 at one end thereof, a body 33 cylindrically extending from another end of the shaft 31, and plural first ribs 35 disposed at an outer circumference of the body 33.

The first ribs 35 protrude at the outer circumference at a same interval with respect to each other. Preferably, the first ribs 35 are eight in number and disposed at an interval of 45°. Two ribs 35*a* are longer than the rest of the ribs 35*b*.

Figure 4:
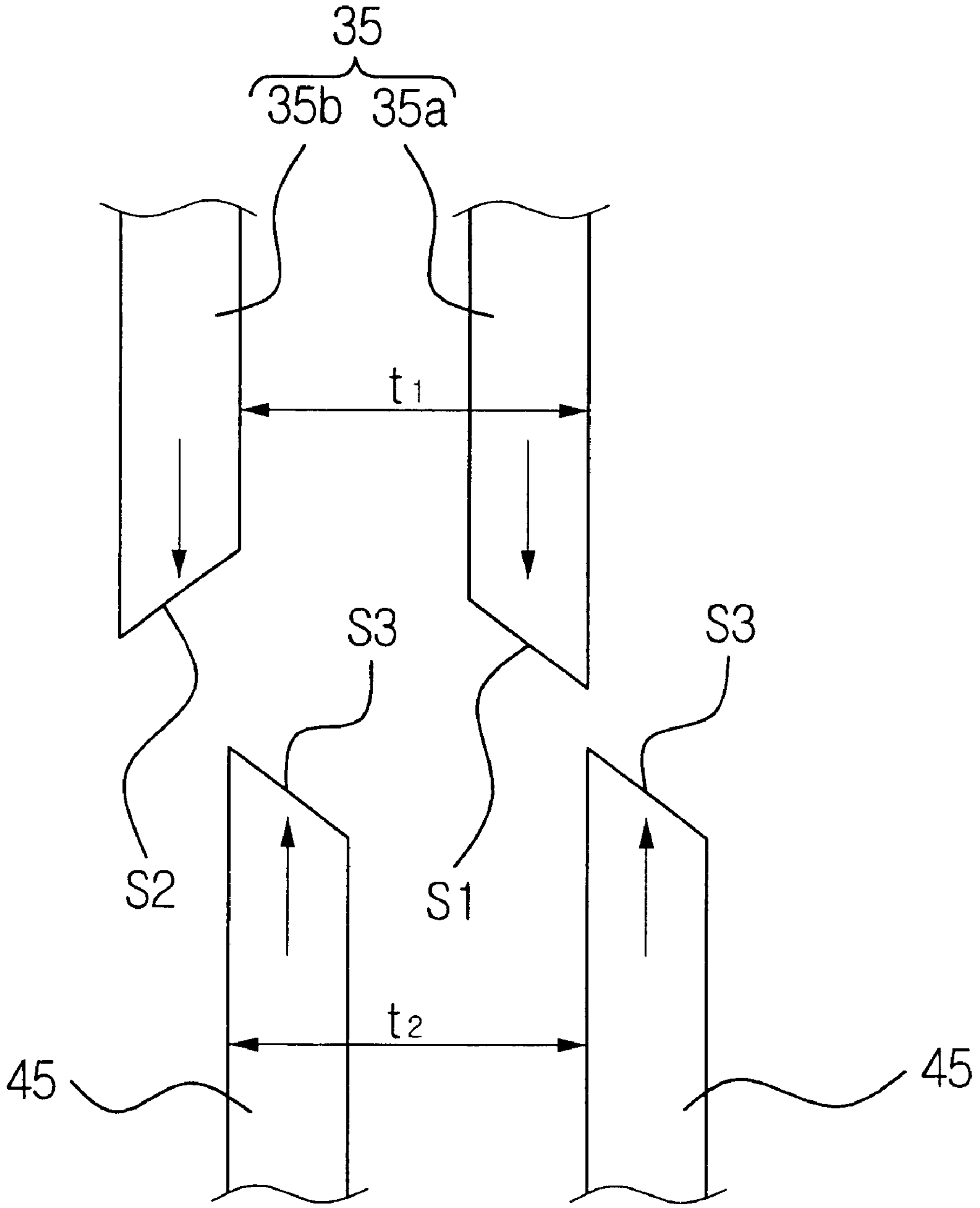
FIGS. 4 through 6 are schematic views respectively illustrating a connection status of the coupling apparatus illustrated in FIG. 3A.

Furthermore, referring to FIG. 4, front ends of the ribs 35*a*, which are longer than the other ribs 35*b*, have sloping sides S1 sloped in a predetermined direction. The sloping sides S1 are sloped in a different direction than sloping sides S2 of front ends of the rest of the ribs 35*b*.

Additionally, the shaft 31 of the first coupler 30 has a power transfer gear 37. The power transfer gear 37 drives a development roller and a toner supply roller disposed at the development cartridge.

The second coupler 40 has a cylindrical connection portion 43, and plural second ribs 45 protruding at an inner circumference of the connection portion 43. The body 33 of the first coupler 30 is inserted into the connection portion 43 by sliding therein. A driving gear 47 is connected with the connection portion 43. The driving gear 47 has power transferred thereto from a driving motor (not shown).

The second ribs 45 are four in number and disposed at the inner circumference of the connection portion 43 at an interval of 90°. The second ribs 45 have the same lengths with respect to each other and sloping sides S3 sloped in a same direction at their front ends. As illustrated in FIG. 4, the sloping sides S3 are sloped in the same direction as the sloping side S1 of the longer ribs 35*a* among the first ribs 35.

The connection operation of the coupling apparatus according to this embodiment having the above structure will be described hereinbelow.

First of all, the first coupler 30 and the second coupler 40 are relatively close to each other while the body 30 is inserted into the connection portion 43. As illustrated in FIG. 4, a pitch interval t1 between the first ribs 35 are different from a pitch interval t2 between the second ribs 45.

Figure 5:
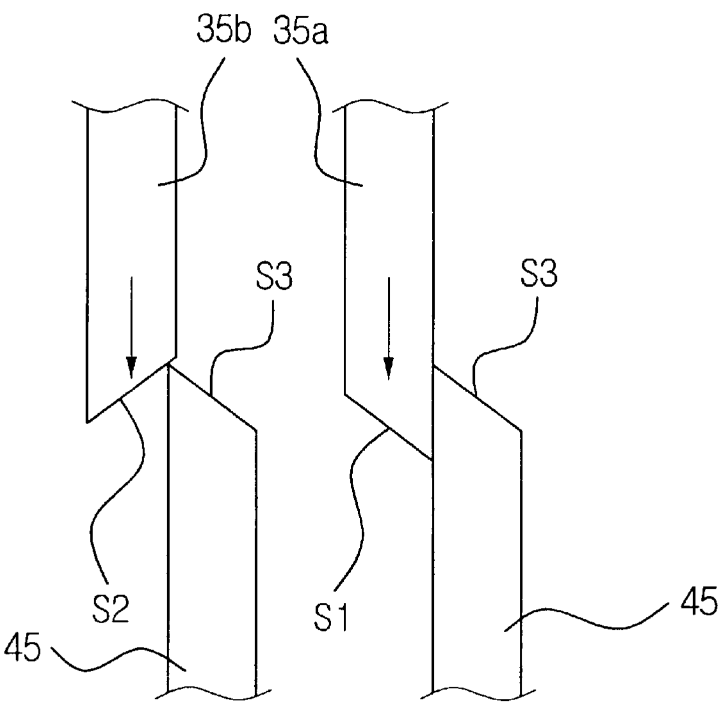
Figure 6:
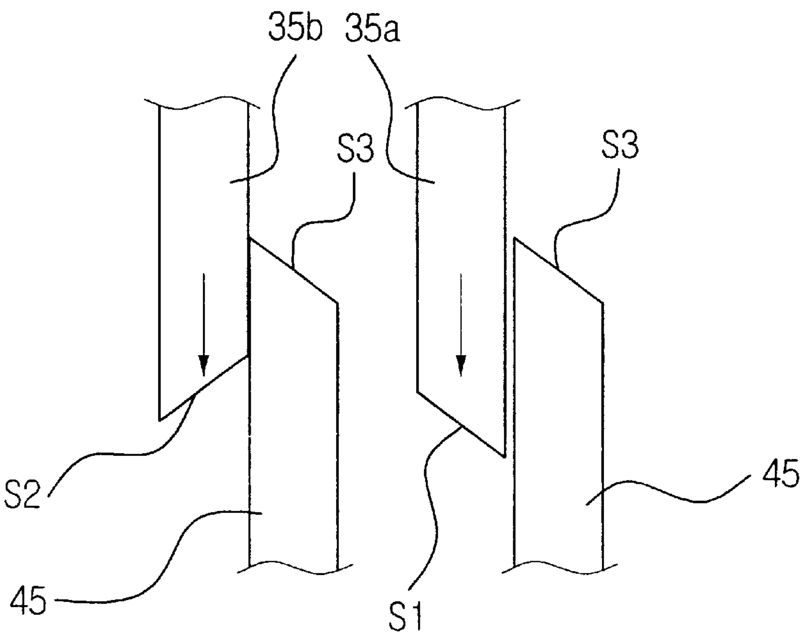

However, the longer ribs 35*a* among the first ribs 35 are guided through the second ribs 45 before the rest of the ribs 35*b*, and positioned at a connection place. In this state, when two couplers 30 and 40 are brought further together, as illustrated in FIG. 5, the longer ribs 35*a* are connected between the ribs 45, and the other ribs 35*b* are in contact with the opposing second ribs 45. Yet, the sloping sides S2 of the ribs 35*b* in contact with ribs 45 are sloped in an opposite direction of the sloping sides S3 of the second ribs 45. Therefore, when each of the couplers 30 and 40 are close to each other in the state that front ends of the second ribs 45 are in contact with the sloping sides S2 of the ribs 35*b*, the front ends of the second ribs 45 are slid along the sloping sides S2, consequently changing the position of the second ribs 45. Accordingly, as illustrated in FIG. 6, the first ribs 35*a* and 35*b* are slid between the second ribs 45 and connected thereto. In this state, when the second coupler 40 is rotated in both directions, each of the ribs 35 and 45 is connected and can transfer the power to the first coupler 30. As described so far, each of the couplers 30 and 40 can easily perform coupling connection even though the interval t1 and t2 of the ribs 35 and 45 are different due to an error in manufacturing. Thus, unconventionally, the work required to connect the first coupler 30 and the second coupler 40 can be reduced.

Accordingly, when the development cartridge having the first coupler 30 is installed in the printer body, each of the couplers 30 and 40 are easily connected with each other and the development cartridge can be changed without any difficulties.

Figure 7:
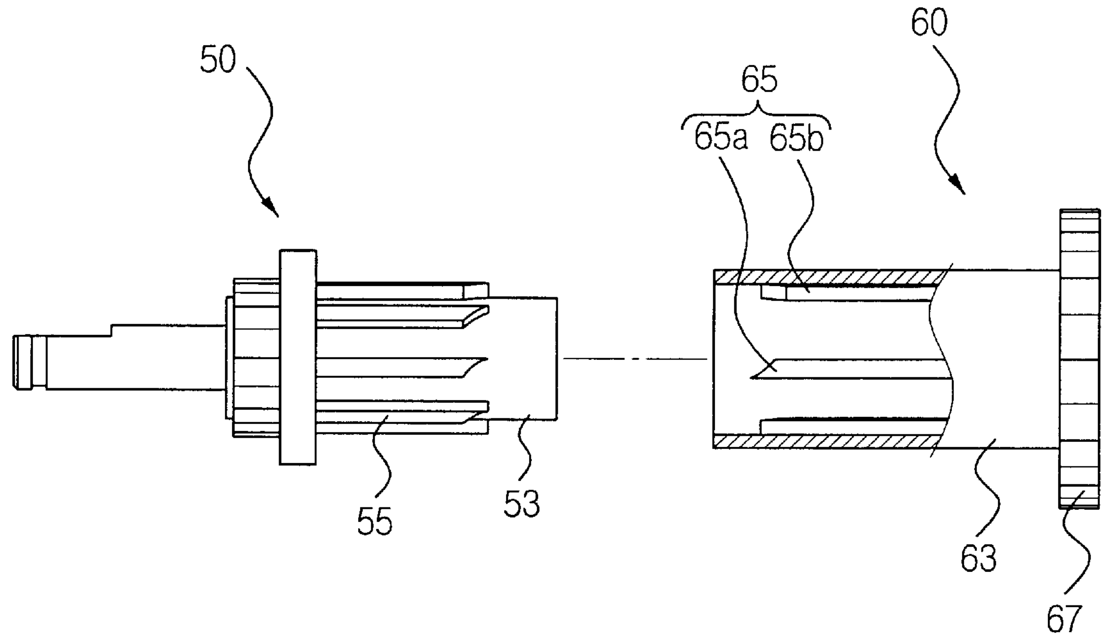
FIG. 7 is a view schematically illustrating a coupling apparatus according to another embodiment of the present invention.

Moreover, as illustrated in FIG. 7, a coupling apparatus according to another embodiment of the present invention has a first coupler 50 having first ribs 55 formed with the same lengths with respect to each other at an outer circumference of a body 53, and a second coupler 60 having second ribs 65 protruding at an inner circumference of a connection portion 63 to embrace the body 53.

The first ribs 55 have the same lengths with respect to each other and are disposed at the outer circumference of the body 53 at a same interval. Moreover, front ends of the first ribs 55 have sloping sides sloped in a same direction.

The second ribs 65 have ribs 65*a* with a relatively longer length as compared to the other ribs 65*b*. Sloping sides formed at front ends of the ribs 65*a* are sloped in a same direction as the sloping sides of the first ribs 55. On the other hand, the sloping sides of the front ends of the ribs 65*a* are formed to be sloped in an opposite direction with sloping sides of front ends of the other ribs 65*b*. The reference numeral 67 is a driving gear connected with the connection portion 63.

The connection operation of the coupling apparatus according to this embodiment of the present invention is the same as the above coupling apparatus described while referring to FIGS. 4, 5, and 6, and thus the description thereof will be omitted here.

According to the coupling apparatus of the embodiment of the present invention described so far, when each of the ribs of the first coupler and the second coupler is not manufactured to have a regular interval, the coupler can be positioned to be connected, as some ribs of the couplers are relatively longer than other ribs.

Moreover, as sloping sides of the front ends of each of the ribs are sloped in different directions, the connection of the couplers is easily performed.

Although a few preferred embodiments of the present invention have been shown and described, it will be appreciated by those skilled in the art that changes may be made in these embodiments without departing from the principles and spirit of the invention, the scope of which is defined in the claims and the equivalents.

What is claimed is:

1. A coupling apparatus to be connected by being slid together to transfer power when being connected, comprising:

a first coupler having a first body and a plurality of first ribs protruding at an outer circumference of the first body at a regular interval; and a second coupler having a connection portion to embrace and be separated from the first body of the first coupler, and a plurality of second ribs protruding at an inner circumference of the connection portion, the plurality of second ribs to be connected between the plurality of first ribs, wherein each of front ends of the first ribs and the second ribs have sloping sides sloped in predetermined directions, and one of the first ribs and the second ribs include at least one rib having a relatively longer length than the other ribs.

2. The coupling apparatus according to claim 1, wherein two of the first ribs are relatively longer than the other ones of the first ribs.

3. The coupling apparatus according to claim 1, wherein two of the second ribs are relatively longer than the other ones of the second ribs.

4. The coupling apparatus according to claim 1, wherein the first ribs are eight in number disposed at a regular interval and two of them are relatively longer with respect to the other ones of the first ribs, and the second ribs are four in number and disposed at a regular interval.

5. The coupling apparatus according to claim 1, wherein ones of the ribs close to the at least one relatively longer rib among the first and the second ribs have sloping sides sloped in a different direction from the ribs of the corresponding coupler.

6. The coupling apparatus according to claim 5, wherein the at least one relatively long rib among the first and the second ribs has sloping sides sloped in a same direction from the ribs of the corresponding coupler.

7. The coupling apparatus according to claim 1, wherein a driving gear is connected with the connection portion of the second coupler to transfer power thereto.

8. A coupling apparatus to transfer power to drive a photosensitive drum disposable in a development cartridge removably connected with a printer body, comprising:

a first coupler having a first coupler body and a plurality of first ribs protruding at an outer circumference of one end of the first coupler body, and another end of the first coupler connected with the photosensitive drum; and a second coupler having a connection portion to embrace and be separated from the first coupler body of the first coupler, and a plurality of second ribs protruding at an inner circumference of the connection portion, wherein one of the first ribs and the second ribs include at least one rib having a relatively longer length than the other ribs.

9. The coupling apparatus according to claim 8, wherein the first ribs are eight in number and disposed at a regular interval, and two ribs among the eight ribs are relatively longer with respect to the other ones of the first ribs.

10. The coupling apparatus according to claim 9, wherein sloping sides sloped in a predetermined direction are formed at front ends of the two ribs among the first ribs that are relatively longer than the other ribs among the first ribs, and sloping sides sloped in a different direction from the predetermined direction of the sloping sides of the relatively longer ribs are formed at front ends of the relatively shorter other ribs.

11. The coupling apparatus according to claim 10, wherein when the longer ribs amount the first ribs are guided through the second ribs, the longer ribs slide between the second ribs and the other ribs among the first ribs contact the opposing second ribs of the second coupler.

12. The coupling apparatus according to claim 11, wherein the sloping sides of the other shorter ribs of the first ribs contacting the second ribs are sloped in an opposite direction from the direction of the sloping sides of the second ribs such that the front ends of the second ribs slide along the sloping direction of the other ribs among the first ribs to position each of the first ribs between the second ribs.

13. The coupling apparatus according to claim 9, wherein sloping sides sloped in a predetermined direction are formed at front ends of the two ribs among the first ribs that are relatively longer than the other ribs among the second ribs, and sloping sides sloped in a different direction from the predetermined direction of the sloping sides of the relatively longer ribs are formed at front ends of the relatively shorter other ribs.

14. The coupling apparatus according to claim 13, wherein the ribs having a relatively longer length among the second ribs comprise ends sloping in a same direction as the sloping sides of the first ribs.

15. The coupling apparatus according to claim 14, wherein the other ribs among the second ribs comprise ends sloping in an opposite direction as the sloping sides of the first ribs such that when the longer ribs among the second ribs are guided through the first ribs, the longer ribs slide between the first ribs and the other ribs among the second ribs contact the opposing first ribs of the first coupler.

16. The coupling apparatus according to claim 15, wherein the other shorter ribs of the second ribs contacting the first ribs comprise sloping sides sloped in an opposite direction than the direction of the sloping sides of the first ribs such that the front ends of the first ribs slide along the sloping direction of the other ribs among the second ribs to position each of the second ribs between the first ribs.

17. The coupling apparatus according to claim 8, further comprising a driving gear connected with the second coupler.

18. The coupling apparatus according to claim 8, wherein a sloping side sloped in a same predetermined direction with ribs of the corresponding coupler are formed at a front end of the at least one rib that is relatively longer than the other ribs among the first and the second ribs, and sloping sides sloped in a different direction than the predetermined direction of the sloping side of the relatively longer rib are formed at front ends of the relatively shorter other ribs.

* * * * *